No. 825,176. PATENTED JULY 3, 1906.
R. W. BAINBRIDGE.
BRAKE.
APPLICATION FILED DEC. 13, 1905.
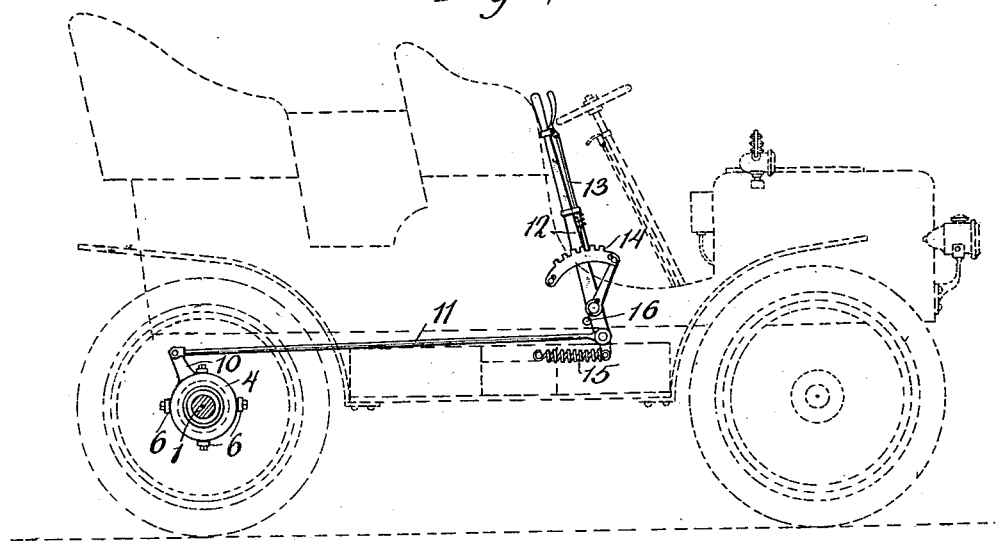
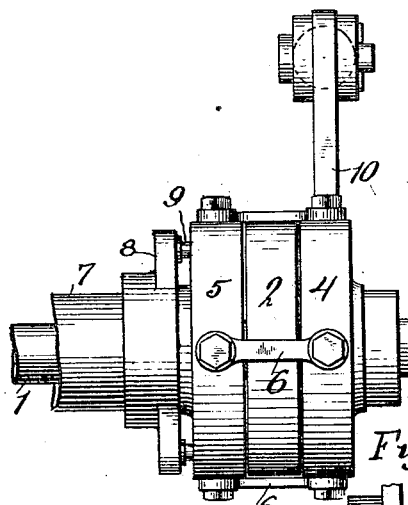
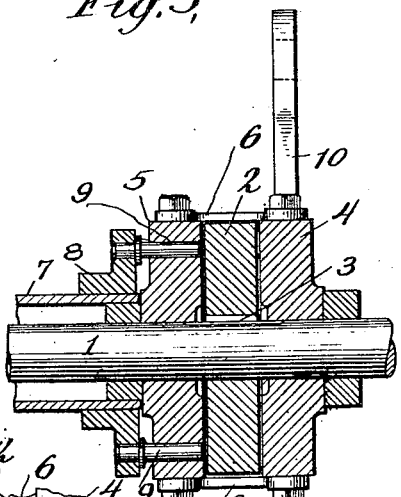
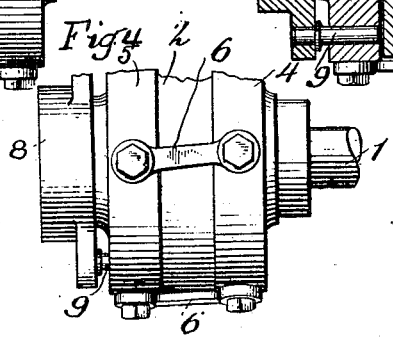
WITNESSES:
INVENTOR
R. W. Bainbridge
BY
ATTORNEY

UNITED STATES PATENT OFFICE.

RICHARD W. BAINBRIDGE, OF NEW YORK, N. Y.

BRAKE.

No. 825,176.  Specification of Letters Patent.  Patented July 3, 1906.

Application filed December 13, 1905. Serial No. 291,585.

*To all whom it may concern:*

Be it known that I, RICHARD W. BAINBRIDGE, a citizen of the United States, residing in the borough of Brooklyn, county of Kings, city and State of New York, have invented certain new and useful Improvements in Brakes, of which the following is a specification.

This invention relates to braking devices operating by the frictional engagement of coacting parts to retard and stop the movement of a moving body. Such braking devices employing the features of my invention while they may be employed in many and widely-different relations are particularly applicable for use on self-propelled vehicles.

The object of the invention is to provide a frictional braking device which is strong and compact and consists of few parts of simple construction, which is efficient, reliable, and durable in operation, and which is self-compensating for wear of the friction-surfaces.

In accordance with my invention I provide on the axle of a vehicle, the shaft of an engine, or other shaft whose rotation is to be retarded three coöperating friction members arranged side by side, the middle one of which is secured to the shaft, while the two outer ones are free of the shaft and are free to move toward and away from the middle one. These two outer friction members are connected together by a plurality of links extending across the middle member and each pivotally connected at each end to one of the outer members. One of these two members is held against rotational movement, while the other is so mounted as to permit of a slight amount of rotation, this movement being effected in any suitable manner, as by means of a lever system operated from a convenient position. When this friction member is moved thus relatively to the other outer member, the links connecting the two members draw them together and bring their adjacent faces into engagement with the faces of the middle friction member carried by the shaft whose speed is to be retarded. The coacting friction-faces may be of any suitable material, and the construction permits of obtaining a very large friction area relatively to the space occupied by the device. The operating mechanism may be very simple and may be arranged to give a direct pull on the friction member to cause the slight rotational movement required to move the two outer friction members into engagement with the middle one.

I have illustrated an embodiment of my invention in the accompanying drawings, in which—

Figure 1 is an elevation of the braking device as applied to an automobile. Fig. 2 is a back view, and Fig. 3 a section, of the brake, showing the parts in the positions to permit free running; and Fig. 4 is a detail view in elevation showing the parts in the braking position.

Referring to the drawings, 1 indicates the shaft whose rotation is to be retarded or stopped by the brake. I have shown this shaft as the rear axle of an automobile carrying the rear wheels at its ends and intermediate its ends supporting the springs on which the body is secured. On this shaft is a friction member consisting of a disk 2, having parallel faces and secured on the shaft in any suitable manner, as by a feather 3. Loosely mounted on shaft 1 on opposite sides of the member 2 are two friction members 4 and 5, the adjacent faces of which are parallel and are adapted to engage the faces of the member 2. The members 4 and 5 are preferably of disk shape also, having openings at their centers through which shaft 1 extends and may be of slightly-greater diameter than the disk 2. Extending across the cylindrical surface of the disk 2 and connecting the disks 4 and 5 are a plurality of links 6, each pivotally connected at each end to one of the disks 4 and 5. These links are of such length that when they lie parallel to the shaft 1 the disks 4 and 5 are out of engagement with the disk 2, as shown in Figs. 2 and 3; but when one of the disks 4 and 5 is moved around shaft 1 a short distance reatively to the other, so that links 6 are turned to a slight angular relation to shaft 1, as shown in Fig. 4, the disks 4 and 5 are drawn toward each other until their adfacent faces engage the faces of the disk 2, secured on shaft 1.

The mechanism for effecting the relative movement of disks 4 and 5 may consist of any suitable means for rotating the two disks in opposite directions or rotating one while the other is held against rotation—such, for instance, as a pivoted lever connected to one or both of the disks. However, the connections to these disks should be so arranged as to permit free lateral movement thereof toward and away from the middle friction member 2. In the drawings I have shown the disk 5 as held against rotational movement by pins 9 entering openings therein, these pins being carried by a casting 8, which is clamped to a casing 7, surrounding the shaft 1. The pins 9 are loose in the openings in disk 5, so that while they prevent rotation of the disk the latter is free to move into and out of engagement with disk 2. Secured to or integral with the disk 4 is an ear 10, to which one end of a rod 11 is pivotally connected, the other end of the rod being similarly connected to one end of a pivoted operating-lever 12, which extends to a position convenient for the operator and carries a suitable handle. This lever may also be provided with a spring-pressed latch 13, coöperating with a toothed segment 14. In order to move the friction member 4 to the inoperative position when the lever 12 is released, a spring 15 may be connected at one end to rod 11 or the lower end of lever 12 and at the other end to the framework of the machine, a stop 16 being arranged to prevent excessive movement in this direction.

The coacting faces of the friction members 2, 4, and 5 may be of any suitable material which will give good frictional engagement, and, if desired, thin disks may be interposed between the coacting parts to ease the braking effect. As thus constructed turning lever 12 on its pivot operates, by means of rod 11, to turn the friction-disk 4 about shaft 1, and as disk 5 is held against rotation in the manner above described the links 6 draw the two disks 4 and 5 together until they engage the disk 2, as shown in Fig. 4. The friction-disk 2, secured on the shaft 1, is thus squeezed between the two coöperating friction-disks 4 and 5, which are held against rotation, so that shaft 1 is retarded and finally stopped. On releasing the operating-lever the spring 15 acts on rod 11 to move disk 4 back to the position shown in Figs. 2 and 3, in which it and disk 5 are out of engagement with disk 2. Only slight lateral movement of disks 4 and 5 is necessary to move them into and out of engagement with disk 2, so that the reciprocation of disk 4 need extend through only a small fraction of a revolution. It will be seen that the mechanism consists of few parts and occupies a small amount of space and that relatively to this space occupied the area of friction-surface is very large, so that a good braking effect is obtained. Moreover, the device is self-compensating with respect to the wear of the friction-surfaces, for as the surfaces wear away it is only necessary to rotate the member 4 through an arc but slightly greater in order to get the same braking effect.

Having now described my invention, what I claim as new therein, and desire to secure by Letters Patent, is as follows:

1. In a brake, a shaft, a friction member secured thereon, two coöperating friction members arranged on opposite sides thereof, means for rotating one of said coöperating friction members relatively to the other, and means actuated on such movement for causing both of said members to engage the first-named friction member, substantially as described.

2. In a brake, a shaft, a friction member secured thereon, two coöperating friction members arranged on opposite sides thereof, means connecting said coöperating friction members, and means for moving one of said members relatively to the other and thereby causing both of them to engage the first-named friction member, substantially as described.

3. In a brake, two friction members, links connecting them, a shaft, a third friction member secured on the shaft and extending between said friction members, and means for moving one of the two friction members relatively to the other and thereby causing both of them to engage the friction member lying between them, substantially as described.

4. In a brake, a shaft, three friction members thereon, the middle one of which is secured to said shaft, links connecting the two outer members, means for preventing rotation of one of said outer members, and means for rotating the other of said outer members, substantially as described.

5. In a brake, a shaft, three friction members thereon, the middle one of which is secured to said shaft, links connecting the two outer members, means for preventing rotation of one of said members, and means for rotating the other of said outer members comprising a pivoted lever connected to said member, substantially as described.

6. In a brake, a shaft, three friction-disks thereon, the middle one of said disks being secured on said shaft and the two outer ones being loose thereon, links connecting said outer disks, means for preventing rotation of one of said outer disks while permitting lateral movement thereof, and means for rotating the other of said disks permitting lateral movement thereof, substantially as described.

7. In a brake, a shaft, three friction-disks thereon, the middle one of said disks being secured on said shaft and the two outer ones being loose thereon, links connecting said outer disks, means for preventing rotation of one of said outer disks while permitting lateral movement thereof, and means for rotating the other of said disks comprising a pivoted lever connected thereto, a latch therefor and a spring to retract the lever when released, substantially as described.

This specification signed and witnessed this 12th day of December, 1905.

RICHARD W. BAINBRIDGE.

Witnesses:
H. C. BAINBRIDGE, Jr.,
B. W. GUINNESS.